(12) United States Patent
Kabe et al.

(10) Patent No.: US 7,133,096 B2
(45) Date of Patent: Nov. 7, 2006

(54) LIQUID CRYSTAL DISPLAY DEVICE

(75) Inventors: Masaaki Kabe, Kanagawa (JP); Youko Takada, Kanagawa (JP); Eiji Sakai, Kanagawa (JP); Makoto Jisaki, Kanagawa (JP); Hidemasa Yamaguchi, Kanagawa (JP); Shuichi Tatemori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/787,482

(22) Filed: Feb. 26, 2004

(65) Prior Publication Data
US 2004/0169801 A1 Sep. 2, 2004

(30) Foreign Application Priority Data
Feb. 28, 2003 (JP) .......................... P2003-054610

(51) Int. Cl.
G02F 1/13 (2006.01)
(52) U.S. Cl. ..................................... 349/114
(58) Field of Classification Search ............... 349/114, 349/117
See application file for complete search history.

(56) References Cited

U.S. PATENT DOCUMENTS

| | | | | |
|---|---|---|---|---|
| 6,285,430 B1 * | 9/2001 | Saito | ............................ | 349/141 |
| 6,297,863 B1 * | 10/2001 | Yamaguchi et al. | ........... | 349/76 |
| 6,570,634 B1 * | 5/2003 | Kim | ............................ | 349/107 |
| 6,753,939 B1 * | 6/2004 | Jisaki et al. | ................. | 349/114 |
| 6,771,334 B1 * | 8/2004 | Kubota et al. | ............... | 349/106 |
| 6,819,379 B1 * | 11/2004 | Kubo et al. | .................. | 349/114 |
| 6,829,025 B1 * | 12/2004 | Sakamoto | .................... | 349/114 |
| 6,836,306 B1 * | 12/2004 | Kubota et al. | ............... | 349/114 |
| 6,885,418 B1 * | 4/2005 | Matsushita et al. | .......... | 349/113 |
| 2001/0048496 A1 * | 12/2001 | Baek | ........................... | 349/114 |
| 2001/0055082 A1 * | 12/2001 | Kubo et al. | .................. | 349/114 |
| 2002/0171792 A1 * | 11/2002 | Kubota et al. | ............... | 349/114 |
| 2003/0030767 A1 * | 2/2003 | Takizawa et al. | ............ | 349/113 |
| 2004/0004687 A1 * | 1/2004 | Baek | ........................... | 349/114 |
| 2004/0012738 A1 * | 1/2004 | Murai et al. | ................. | 349/114 |
| 2004/0080690 A1 * | 4/2004 | Ko et al. | ...................... | 349/114 |
| 2004/0145691 A1 * | 7/2004 | Kubota et al. | ............... | 349/114 |
| 2004/0165130 A1 * | 8/2004 | Ozawa et al. | ................ | 349/114 |
| 2004/0169801 A1 * | 9/2004 | Kabe et al. | .................. | 349/114 |
| 2004/0183969 A1 * | 9/2004 | Iijima | ........................... | 349/114 |
| 2004/0201801 A1 * | 10/2004 | Park et al. | ................... | 349/114 |
| 2005/0094068 A1 * | 5/2005 | Ikeno et al. | ................. | 349/114 |

* cited by examiner

Primary Examiner—James A. Dudek
(74) Attorney, Agent, or Firm—Sonnenschein Nath & Rosenthal LLP

(57) ABSTRACT

A liquid crystal display device free from reduction of chromaticity and having a good image quality in comparison with a normally white mode semi-transmission liquid crystal display device even in a case of employing a normally black mode, able to secure a gap of a reflection portion able to suppress occurrence of defects, enabling a reduction of voltage, able to realize a reduction of power consumption, exhibiting a more natural color of the dark state of transmission, and able to improve the image quality, wherein a reflection portion and a transmission portion are provided in one pixel, a normally black mode which becomes a dark state when no voltage is supplied is employed, an orientation mode of the liquid crystals is a twist orientation, a polarization plate and one phase difference plate are provided on a viewing surface side, and a polarization plate is provided on a back surface side.

4 Claims, 27 Drawing Sheets

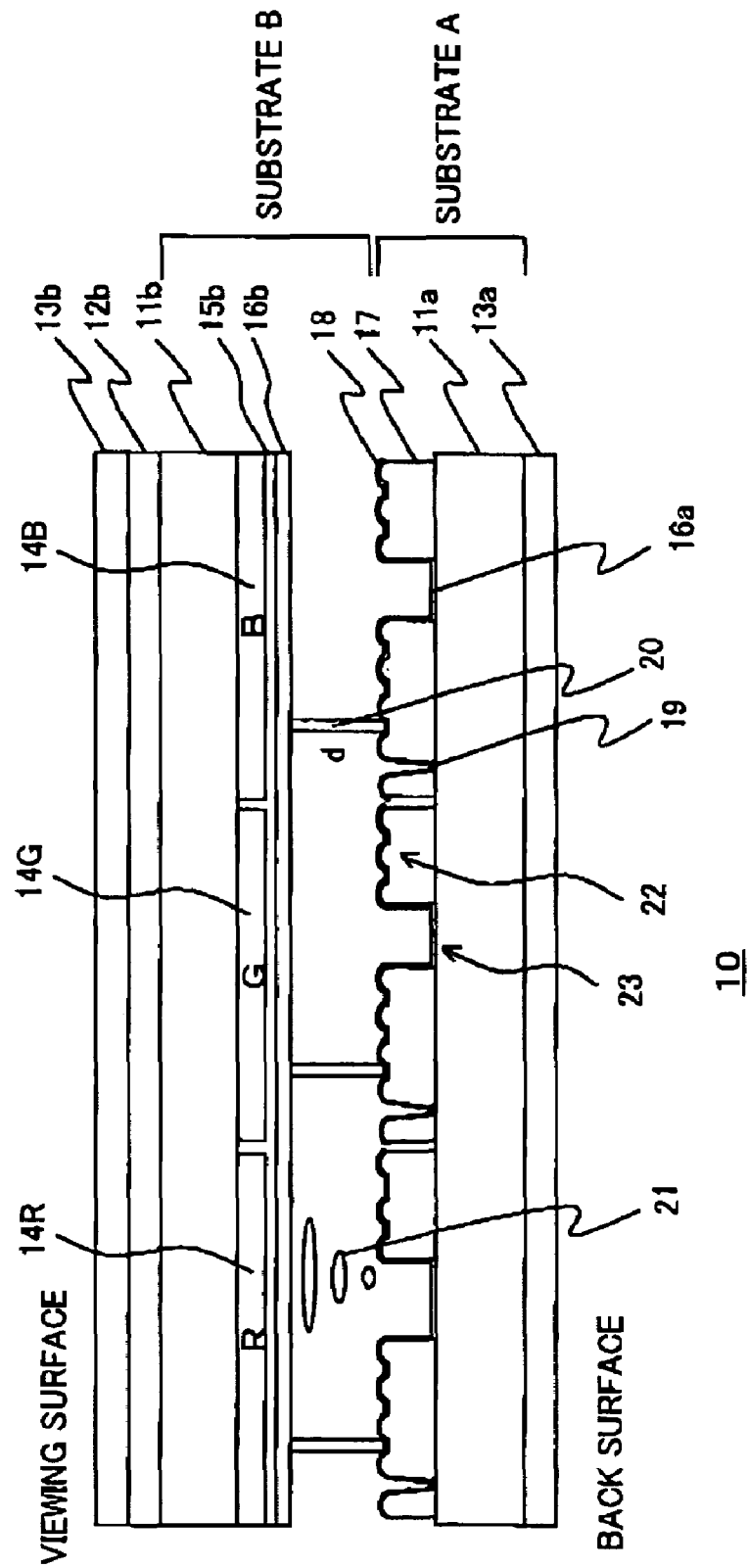

FIG. 9

|  | TNB | HNB |
|---|---|---|
| RATE OF POINTS REDUCED | 7% | 13% |
| GAP DEFECT RATE | 7% | 9% |

FIG. 14

|  | x | y |
|---|---|---|
| HOMOGENEOUS ORIENTATION | 0.20 | 0.15 |
| TWIST ORIENTATION | 0.32 | 0.22 |

FIG. 23

|  | Nz=1 | Nz=0.5 | Nz=0 |
|---|---|---|---|
| 0 DEGREE AZIMUTH | 40 | 55 | 65 |
| 90 DEGREE AZIMUTH | 50 | 60 | 70 |
| 180 DEGREE AZIMUTH | 50 | 60 | 70 |
| 270 DEGREE AZIMUTH | 50 | 60 | 70 |

LIQUID CRYSTAL DISPLAY DEVICE

BACKGROUND OF THE INVENTION

1. Field of the Invention

The present invention relates to semi-transmission type liquid crystal display device having a reflection portion and a transmission portion together in one pixel region.

2. Description of the Related Art

In recent years, mobile phones, personal data assistants (PDAs), and other portable information terminals have spread in use. Demand for liquid crystal display devices, which have the advantages of thin shape and the light weight, is rising as a result.

Transmission type liquid crystal display devices for display utilizing backlight consume large power since the backlight is always turned on. Further, under sunlight or other very strong ambient light, the ambient light becomes stronger than the display brightness, so the viewability is remarkably deteriorated ("washout"). For these reasons, these are not suitable as the display devices of portable information terminals for which a reduction of the power consumption is demanded and for which a good viewability under any environment is demanded.

On the other hand, reflection type liquid crystal display devices for display utilizing external light consume very low power since backlight is not required and in principle do not suffer from washout even under sunlight. For this reason, they are suitable as the display devices of portable information terminals. In dark places where the ambient light is weak, the display becomes hard to see, but it is possible to arrange a front light at the display surface side of a reflection type liquid crystal display device and turn on the front light to secure the viewability under all environments.

As a reflection type liquid crystal display device, for example, Japanese Unexamined Patent Publication (Kokai) No. 10-154817 discloses a normally black mode using one phase difference plate on the display surface side.

Further, Japanese Examined Patent Publication No. 3236504 discloses a normally white mode using two phase difference plates on the viewing surface side.

In the front light system, the front light is arranged at the viewing surface side, so there are the defects that a reduction of the contrast is induced and the viewability is lowered. As a method of avoiding this, a semi-transmission type liquid crystal display device provided with a reflection portion and a transmission portion in each pixel portion and arranging a backlight at the back surface is disclosed in Japanese Unexamined Patent Publication (Kokai) No. 2000-333624. In this method, since nothing is arranged at the viewing surface side, the contrast is not lowered and the viewability is good under all environments.

Generally, semi-transmission type liquid crystal display devices as well come in the normally white mode and the normally black mode.

FIG. 1 is a sectional view of a semi-transmission type liquid crystal display device of the normally white mode.

In this semi-transmission type liquid crystal display device, at the back surface side, a first surface side of a transparent substrate 1a has a phase difference plate (λ/4) 2a, a phase difference plate (λ/2) 3a, and a polarization plate 4a stacked on it. A transparent electrode (ITO film) 5 is formed in a region of approximately half of a second surface side of the transparent substrate 1a, an insulator 6 thicker than the transparent electrode 5 is formed in the region where the transparent electrode 5 is not formed, and a reflection electrode 7 is formed on the insulator 6. On the viewing surface side, at the back surface side, a first surface side of a transparent substrate 1b has a phase difference plate (λ/4) 2b, a phase difference plate (λ/2) 3b, and a polarization plate 4b stacked on it. A common electrode 8 is formed on a second surface (upper surface) side of the transparent substrate 1b. Further, the transparent electrode 5 and reflection electrode 7 and the common electrode 8 are bonded so that they face each other. Liquid crystals 9 are sealed between these electrodes.

FIG. 2 is a sectional view of a semi-transmission type liquid crystal display device of a normally black mode (for example refer to IDW'00 Preprints LCT2-2, p. 41–44). In FIG. 2, for easy comparison of the configuration with the semi-transmission type liquid crystal display device of the normally white mode of FIG. 1, the same components are given the same reference numerals. The points of difference of the semi-transmission type liquid crystal display device of the normally black mode from the semi-transmission type liquid crystal display device of the normally white mode are that only one phase difference plate (λ/2) 3b is arranged on the viewing surface side and that no phase difference plate is arranged on the back surface side.

As will be understood also from FIG. 1, the semi-transmission type liquid crystal display device of the normally white mode uses two phase difference plates on the viewing surface side and two phase difference plates on the back surface side, i.e., a total of four phase difference plates. This becomes a cause of higher cost. Further, in recent years, advances have been made in reducing the thickness of liquid crystal display devices, but if using these four phase difference plates, reduction of thickness inevitably becomes difficult.

On the other hand, the semi-transmission type liquid crystal display device of the normally black mode, as shown in FIG. 2, uses one phase difference plate on the viewing surface side, but does not use a phase difference plate on the back surface side, so enables realization of a lower cost in comparison with the normally white mode and is further advantageous in the reduction of thickness. Note that the orientation mode of the liquid crystal disclosed here is the homogeneous orientation.

Summarizing the problems to be solved by the invention, based on IDW'00 Preprints LCT2-2, p. 41–44, red (R), green (G), and blue (B) color filters were formed in the substrate 1b on the viewing surface side of the semi-transmission type liquid crystal display device of the normally black mode system and the chromaticities of colors in the reflection mode and the transmission mode in the case where voltages were supplied to the pixels of the different colors were measured. In the same way, a semi-transmission type liquid crystal display device of the normally white mode system was prepared and the chromaticities measured.

FIG. 3A is a view of results of measurement of reflection chromaticities of semi-transmission type liquid crystal display devices of a normally white mode and a homogeneously oriented normally black mode. FIG. 3B is a view of results of measurement of the transmission chromaticities of semi-transmission type liquid crystal display devices of a normally white mode and a homogeneously oriented normally black mode. In FIGS. 3A and 3B, the characteristics indicated by NW show the results of measurement of the normally white mode, and the characteristics indicated by HNB show the results of measurement of the homogeneously oriented normally black mode.

As will be understood from the figures, a homogeneously oriented normally black mode semi-transmission type liquid crystal display device has the disadvantage that a remarkable reduction of the chromaticity is seen in comparison with the chromaticity of the normally white mode semi-transmission type liquid crystal display device, so it is very poor in image quality.

Further, in the case of a homogeneously oriented normally black semi-transmission type liquid crystal display device, in order to realize a good dark state in the reflection portion, when the thickness of the liquid crystal layer of the reflection portion is "d", Δnd=135 nm, and the phase difference value of the phase difference plate on the viewing surface side is preferably 275 nm. In terms of production, the refractive index difference Δn of a liquid crystal material for which reliability can be secured is 0.07 or more. When further considering the response of the liquid crystals and other characteristics, 0.075 or more is more preferred When using a liquid crystal material of Δn=0.075, the gap of the liquid crystal layer of the reflection portion becomes 1.8 μm. Usually, when lower than 2 μm, short-circuits of the upper and lower substrates and gap failure due to entry of foreign matter frequently occur. For this reason, a normally black mode semi-transmission type liquid crystal display device using homogeneous orientation has the disadvantage that production is very difficult.

Further, when using homogeneous orientation, there are the disadvantages that the inclination of a transmittance curve with respect to the voltage is gentle, a reduction of the voltage is very difficult, and, as a result, a reduction of the power consumption is difficult.

Further, in this homogeneously oriented normally black mode semi-transmission type liquid crystal display device, a phase difference plate is not used on the back surface side, only a polarization plate is used. In this case, wavelength dispersion cannot be compensated for in the transmission light. Therefore, the dark state, that is, the black color, becomes colored. In actuality, in a homogeneously oriented semi-transmission type liquid crystal display device, it was confirmed that the dark state was colored blue, so the image quality was not good.

Further, in a normally black mode semi-transmission type liquid crystal display device, when the shape of the boundary between the transmission portion and the reflection portion is rectangular, there is the disadvantage that light is reflected at the reflection electrode portion (refer to FIG. 2) of the recessed portion of the reflection portion step difference, so the reflection contrast is lowered.

SUMMARY OF THE INVENTION

A first object of the present invention is to provide a liquid crystal display device giving a good image quality without a reduction of the chromaticity in comparison with a normally white mode semi-transmission type liquid crystal display device even in a case when employing a normally black mode, able to secure a gap of the reflection portion able to suppress occurrence of defects, enabling a reduction of the voltage, able to realize a lower power consumption, having a more natural color in the dark state in the transmission, and able to improve the image quality.

A second object of the present invention is to provide a liquid crystal display device able to prevent a reduction of the reflection contrast by giving a shape other than a straight line to the boundary between the transmission portion and the reflection portion on the side opposite to the main viewing angle direction.

To attain the above objects, according to the present invention, there is provided a liquid crystal display device including a reflection portion and a transmission portion in one pixel and employing a normally black mode wherein a dark state is exhibited when no voltage is supplied, wherein an orientation mode of the liquid crystal is a twist orientation, a polarization plate and one phase difference plate are provided on a viewing surface side, and a polarization plate is provided on a back surface side.

Preferably, a ratio dt/dr between a gap dt of the transmission portion and a gap dr of the reflection portion satisfies a relationship of $1.7 \leq dt/dr \leq 2.05$ Preferably, the twist angle is 30 degrees to 60 degrees.

Preferably, a phase difference value of the phase difference plate on the viewing surface side at a wavelength of 550 nm is 310 nm or more.

Preferably, in the phase difference plate on the viewing surface side, when a refractive index of an extension direction of the phase difference plate is nx, a refractive index of a perpendicular direction to the extension direction is ny, a refractive index in a normal direction with respect to the phase difference plate surface is nz, and a value represented by the following equation is nz, $$Nz=(nx-nz)/(nx-ny)$$

where, Nz satisfies the relationship of $0 \leq Nz \leq 0.5$.

Preferably, at least one side in the shape of the boundary between the transmission portion and the reflection portion is a shape other than a straight line.

According to the present invention, there is provided a normally black mode liquid crystal display device providing a reflection portion and a transmission portion in one pixel, providing a polarization plate and one phase difference plate on a viewing surface side, and providing a polarization plate on a back surface side, wherein an orientation mode of the liquid crystal is made a twist orientation so as to form a gap of the reflection portion at a level where no problem occurs in terms of production. Further, it is possible to make the R, G, and B reflection and transmission chromaticities substantially equivalent to those of the normally white mode, so a reduction of the image quality is eliminated in comparison with the normally white mode. Further, the brightness saturation voltage is lowered, and a reduction of the power consumption is achieved. Further, it becomes possible to make the chromaticity of the dark state of the transmission a more natural black, and the improvement of the image quality is achieved in comparison with homogeneous orientation.

Further, according to the present invention, since for example the twist angle is made 30 degrees to 60 degrees, the phase value of the phase difference plate on the viewing surface side is made 310 nm or more, and the ratio dt/dr between the reflection portion gap dr and the transmission portion gap dt is made 1.7 to 2.05, the gap of the reflection portion can be made a level where there is no problem and it is possible to hold the characteristics of the reflection and the transmission.

Further, according to the present invention, in the phase difference plate on the viewing surface side, when the refractive index of the extension direction of the phase difference plate is nx, the refractive index of the perpendicular direction to the extension direction is ny, the refractive index of the normal direction with respect to the phase difference plate surface is nz=(nx−nz)/(nx−ny), the value of Nz satisfies the relationship $0 \leq Nz \leq 0.5$, so an increase of the transmission viewing angle is achieved.

Further, according to the present invention, since at least one side in the shape of the boundary between the transmission portion and the reflection portion is a shape other than the straight line, the reflection contrast of the main vision direction is improved.

BRIEF DESCRIPTION OF THE DRAWINGS

These and other objects and features of the present invention will become clearer from the following description of the preferred embodiments given with reference to the attached drawings, wherein:

FIG. 4 is a sectional view of a twist oriented normally black mode semi-transmission liquid crystal display device according to the present invention;

FIG. 9 is a view of defect rates of a twist oriented normally black mode semi-transmission liquid crystal display device and a homogeneously oriented normally black mode semi-transmission liquid crystal display device;

FIG. 14 is a view of the chromaticity of the dark state of transmission;

FIG. 23 is a view of measurement values of a transmission viewing angle;

DESCRIPTION OF THE PREFERRED EMBODIMENTS

Figure 1:
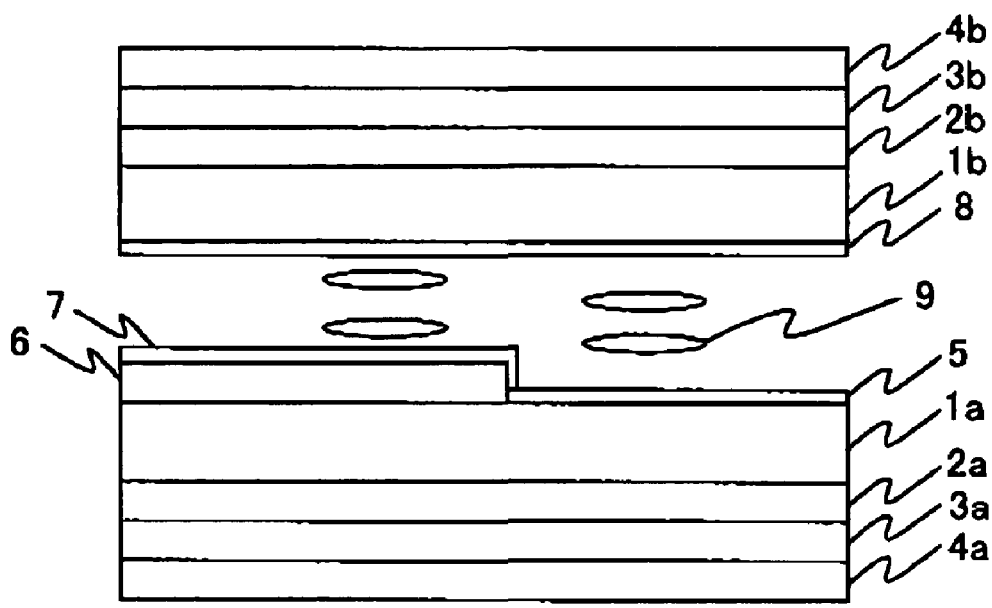
FIG. 1 is a sectional view of a semi-transmission type liquid crystal display device of a normally white mode system.
Figure 2:
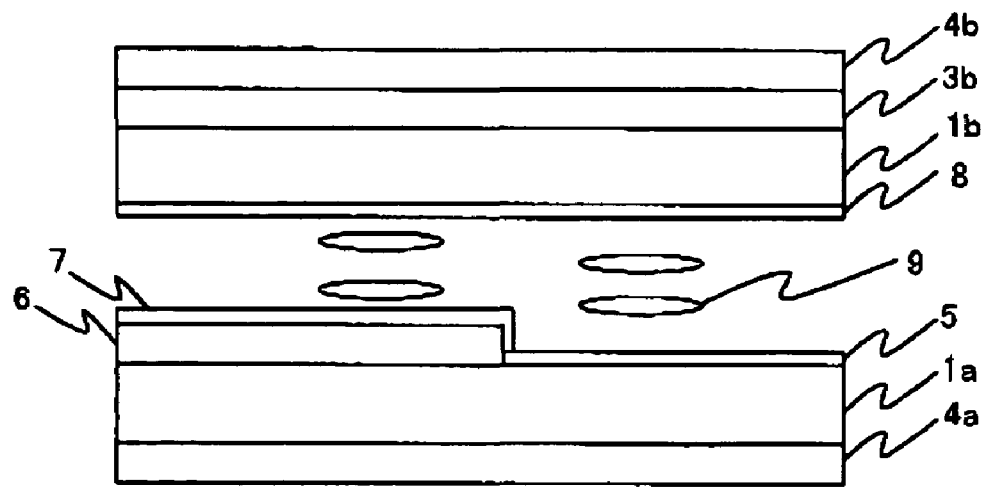
FIG. 2 is a sectional view of a semi-transmission type liquid crystal display device of a normally black mode system using homogeneous orientation.
Figure 3A:
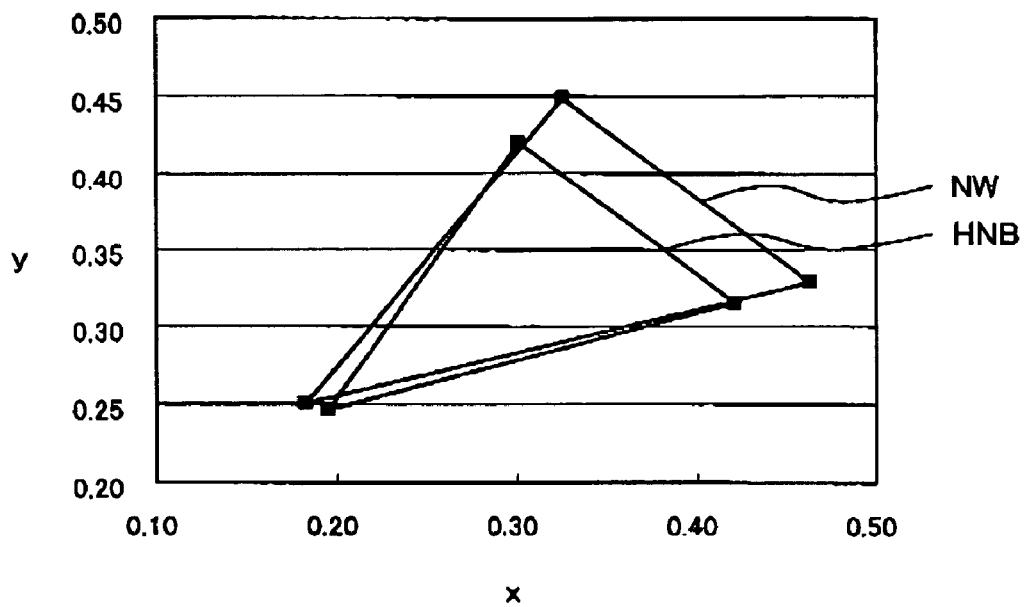
FIGS. 3A and 3B are views of reflection chromaticities and transmission chromaticities of a normally white mode semi-transmission type liquid crystal display device and a homogeneously oriented normally black mode semi-transmission liquid crystal display device.
Figure 3B:
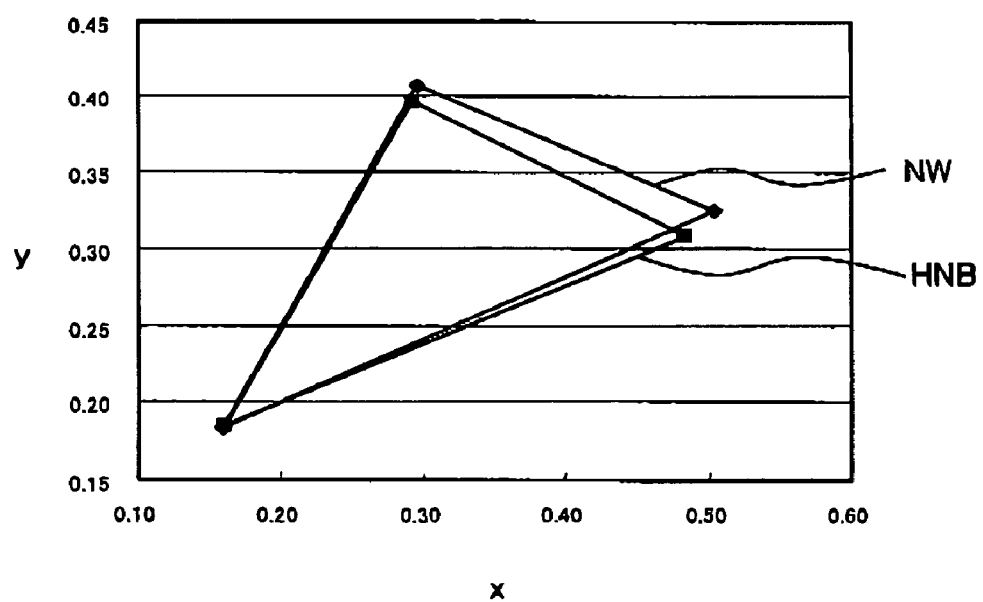

Below, an explanation will be given of embodiments of the present invention with reference to the drawings.

First Embodiment

FIG. 4 is a sectional view of a twist oriented normally black mode semi-transmission liquid crystal display device according to the present invention.

This normally black mode semi-transmission liquid crystal display device 10 has, as shown in FIG. 4, a back surface side substrate A (TFT (thin film transistor) substrate) and a viewing surface side substrate B. Further, in FIGS. 4, 11a and 11b indicate transparent glass substrates, 12b indicates a phase difference plate, 13a and 13b indicate polarization plates, 14R, 14G, and 14B indicate color filters, 15b indicates an overcoat, 16a and 16B indicate ITO electrodes (transparent electrodes), 17 indicates an insulator, 18 indicates a reflection electrode (Ag electrode), 19 indicates a TFT element, 20 indicates a column, 21 indicates a liquid crystal, 22 indicates a reflection portion, and 23 indicates a transmission portion.

First, an explanation will be given of the substrate A (TFT substrate). A TFT element 19 is formed at each pixel on the transparent glass substrate 11a. A step difference having a relief portion made of a photo-sensitive resin as the material is formed on that through a photolithography step. Note that, this step difference can be controlled by the thickness of the coating of the photo-sensitive resin. Further, a reflection electrode 18 made of silver (Ag) having a thickness of 100 nm is formed at the relief portion (reflection portion) 22, and an ITO electrode 16a having a thickness of 50 nm is formed at a place other than the relief portion (transmission portion). Note that, although not illustrated, an orientation film for orienting the liquid crystal 21 is formed after passing through these steps.

Next, an explanation will be given of the substrate B (color filter substrate). A transparent glass substrate 11b is formed with red (R), green (G), and blue B color filters 14R, 14G, and 14B, an overcoat 15b, and an ITO electrode 16b serving as a common electrode. Further, a column 20 made of a photo-sensitive resin (NN710G, made by JSR) is formed at each pixel through a photolithography step. Note that, although not illustrated, the orientation film is formed after passing through these steps.

After the substrate A and the substrate B are rubbed at predetermined angles, they are bonded so that their electrodes faced each other. Through an injection step, a liquid crystal material having a refractive index difference Δn=0.075 is injected between the substrate A and the substrate B. Note that a gap "d" between the reflection portion of the substrate A side and the ITO electrode 16b on the substrate B side is controlled by the columns 20. The column height "d" can be adjusted by the thickness of the coating of the NN710G. In the present embodiment, five types of liquid crystal display devices in total having column heights "d" of 2.6 μm, 2.7 μm, 2.8 μm, 2.9 μm, and 3.0 μm were prepared. Further, in these devices, the value from the ITO electrode 16a of the transmission portion 23 of the substrate A to the average height of the Ag surface (reflection electrode surface) of the reflection portion 22 was set to 2.6 μm.

Further, at the viewing surface side, a phase difference plate 12b having a phase difference value of 355 nm at a wavelength of 550 nm and a polarization plate 13b are bonded to a first surface side of the transparent glass substrate 11b. At the back surface side, only a polarization plate 13a is bonded to a first surface side of the transparent glass substrate 11a.

Figure 5B:
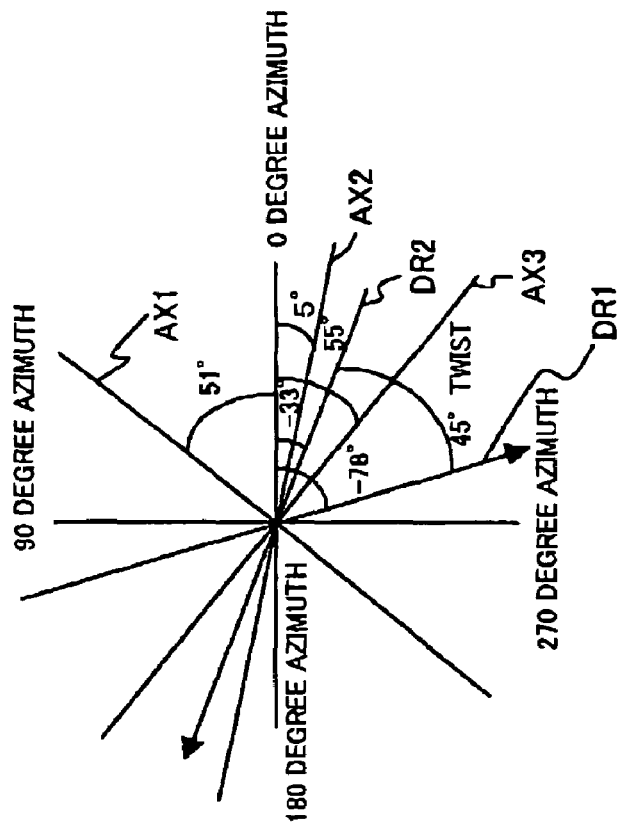
FIGS. 5A and 5B are conceptual views seen from a viewing surface side of a twist oriented normally black mode semi-transmission liquid crystal display device used in an embodiment and shows azimuths of a polarization plate and phase difference plate and a rubbing direction.
Figure 5A:
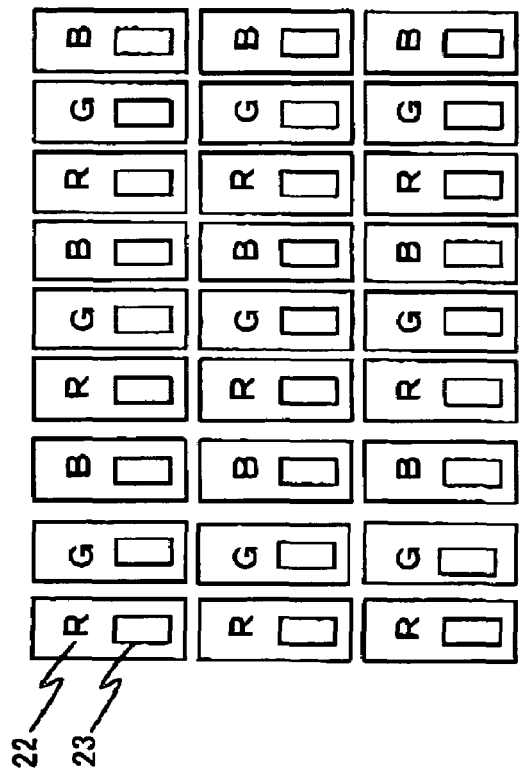

FIG. 5A is a conceptual view seen from the viewing surface side of a twist oriented normally black mode semi-transmission liquid crystal display device used in the present embodiment. Further, FIG. 5B is a view of the azimuths of the polarization plates and the phase difference plate and the rubbing direction. FIG. 5A is a plan view seen from the viewing surface side of the liquid crystal display device, while FIG. 5B simultaneously shows the rubbing direction, the phase delay axis direction of the phase difference plate, and an absorption axis direction of the polarization plate. Note that, in FIG. 5B, AX1 indicates the phase delay axis of the phase difference plate 12b, AX2 indicates the absorption axis of the back surface side polarization plate 13a, AX3 indicates the absorption axis of the viewing surface side polarization plate 13b, DR1 indicates the rubbing direction of the substrate A side, and DR2 indicates the rubbing direction of the substrate B side. The orientation of the liquid crystal layer is the twist orientation, and the twist angle is 45 degrees, On the other hand, for comparison, five types of homogeneously oriented normally black mode semi-transmission liquid crystal display devices in total using the substrate A and the substrate B and having column heights of 1.6 μm, 1.7 μm, 1.8 μm, 1.9 μm, and 2.0 μm were prepared. The differences of them from the twist oriented normally black mode semi-transmission liquid crystal display devices are:

a value from the transmission portion ITO of the substrate A to the average height of the reflection portion Ag surface of 1.8 μm;

anti-parallel rubbing so that the liquid crystal orientation becomes the homogeneous orientation; and the polarization plate angle on the viewing surface side, the phase difference value and angle of the phase difference plate, and the angle of the polarization plate of the back surface.

Note that, as the phase difference plate, use is made of one having a phase difference value of 275 nm at a wavelength of 550 nm.

Figure 6B:
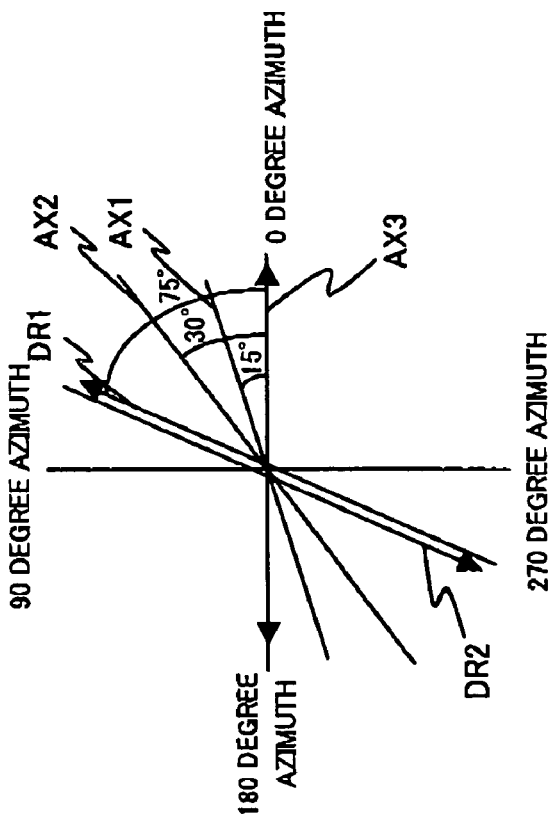
FIGS. 6A and 6B are conceptual views seen from a viewing surface side of a homogeneously oriented normally black mode semi-transmission liquid crystal display device and shows azimuths of a polarization plate and phase difference plate and a rubbing direction.
Figure 6A:
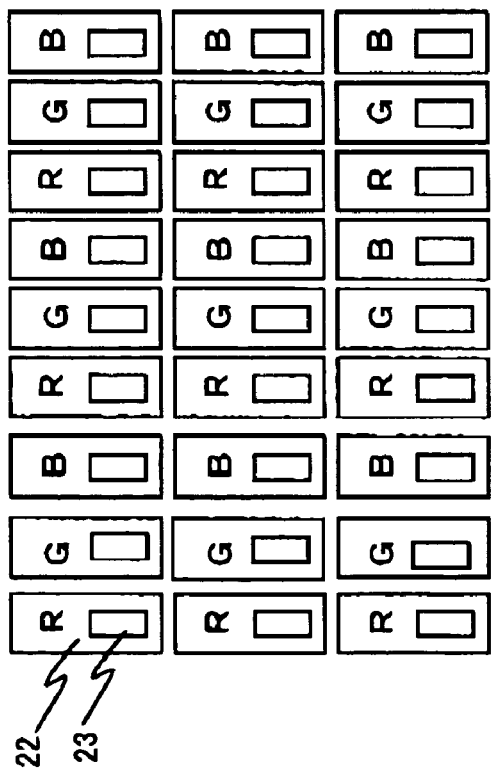

FIG. 6A is a conceptual view seen from the viewing surface side of a homogeneously oriented normally black mode semi-transmission liquid crystal display device used in the present embodiment. Further, FIG. 6B is a view of the azimuths of the polarization plates and the phase difference plate and the rubbing direction. FIG. 6A is a plan view seen from the viewing surface side of the liquid crystal display device, while FIG. 6B simultaneously shows the rubbing direction, the phase delay axis direction of the phase difference plate, and the absorption axis direction of the polarization plate. Note that, in FIG. 6B, similar to FIG. 5B, AX1 indicates the phase delay axis of the phase difference plate 12b, AX2 indicates the absorption axis of the back surface side polarization plate 13a, AX3 indicates the absorption axis of the viewing surface side polarization plate 13b, DR1 indicates the rubbing direction of the substrate A side, and DR2 indicates the rubbing direction of the substrate B side.

Figure 7:
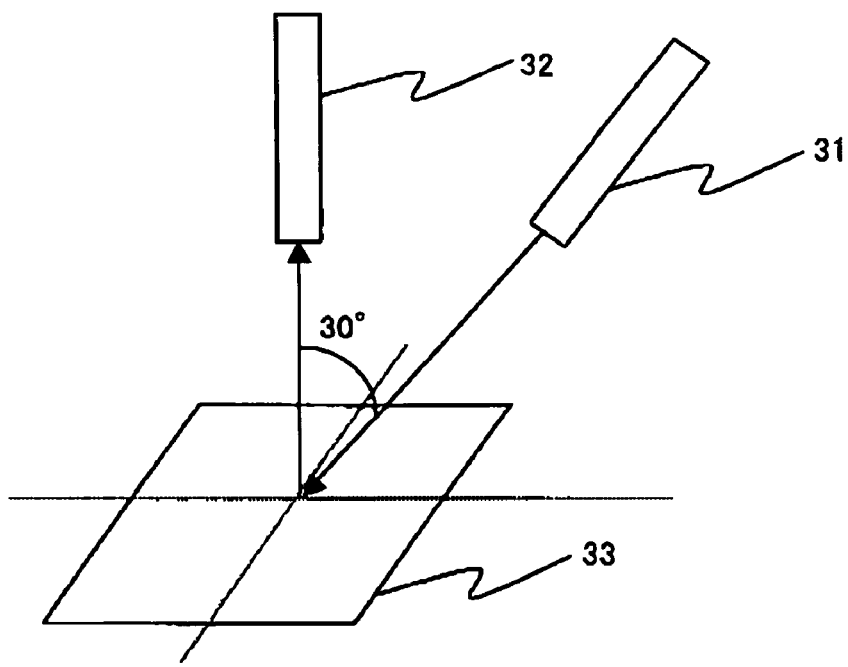
FIG. 7 is a view of a measurement device of a reflection contrast.

The reflection contrast characteristics of the above 10 types of liquid crystal display devices were measured by using the device 30 shown in FIG. 7, In FIG. 7, 31 indicates a light source, 32 indicates a light receiving element, and 33 indicates a liquid crystal display panel.

Figure 8A:
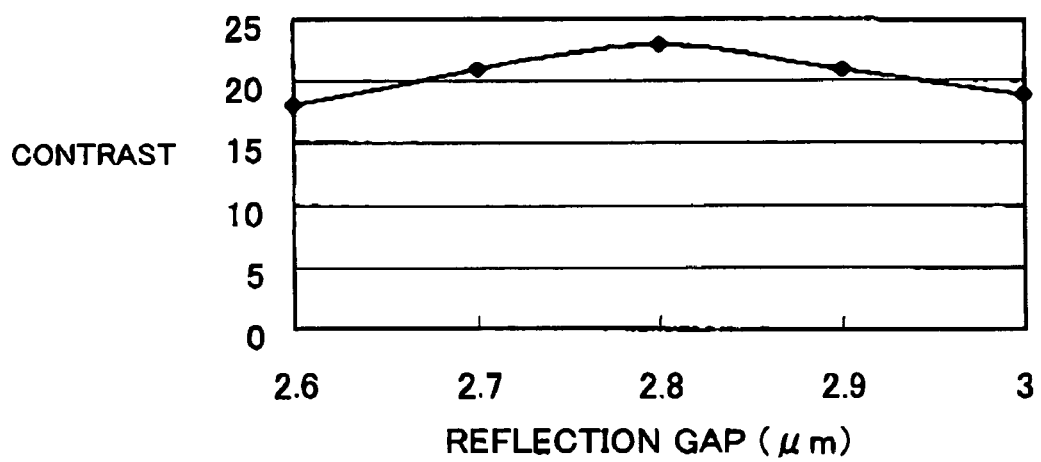
FIGS. 8A and 8B are views of reflection contrasts of a twist oriented normally black mode semi-transmission liquid crystal display device and a homogeneously oriented normally black mode semi-transmission liquid crystal display device.
Figure 8B:
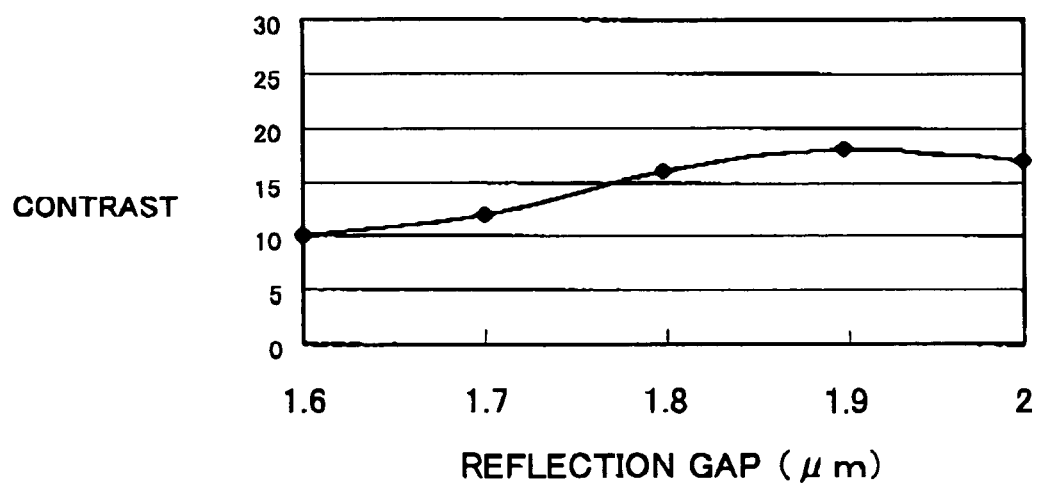

Parallel beams from the light source 31 are made incident from an azimuth of 90 degrees of the liquid crystal display device and a direction inclined by 30 degrees from the substrate normal direction. The light reception angle is the substrate normal direction. The results of measurement of the reflection contrast characteristics are shown in FIGS. 8A and 8B. FIG. 8A shows the reflection contrast of the twist orientation, while FIG. 8B shows the reflection contrast of the homogeneous orientation. Note that, in FIGS. 8A and 8B, an abscissa represents the reflection gap "d", and an ordinate represents the contrast.

As will be understood from this, in devices of a twist orientation, the device having a column height of 2.8 μm had the highest reflection contrast of 23. In devices of a homogeneous orientation, the device having a column height of 1.8 μm had the highest reflection contrast of 18. From the above description, it was confirmed that by employing the twist orientation, it becomes possible to prepare a device having a wider reflection gap "d"—which is very advantageous from the viewpoint of the yield. Further, the degree of the improvement of the yield was confirmed by preparing 300 panels of devices having twist orientation having the column height of 2.8 μm and devices of homogeneous orientation having the column height of 1.8 μm. As a result, the number of minus points due to short-circuiting of the upper and lower substrates and the number of the gap defects due to the entry of foreign matter etc. became as shown in FIG. 9. In FIG. 9, TNB indicates the normally black mode semi-transmission liquid crystal display device of the twist orientation, and HNB indicates the normally black mode semi-transmission liquid crystal display device of the homogeneous orientation. Note that, a panel is judged defective when there are two or more minus marks. Further, a panel is judged defective when there is even one gap defect due to foreign matter in a panel. Each defect is independently counted. It will be understood from FIG. 9 that the number of minus marks is clearly smaller than that of the devices of the twist orientation. Further, there are fewer gap defects in the twist orientation. It was confirmed from this that by using the twist orientation, devices having a wider reflection gap became possible and therefore the yield was improved.

Second Embodiment

The voltage-transmittance characteristics of a semi-transmission liquid crystal display device of a twist orientation having a column height of 2.8 μm and a semi-transmission liquid crystal display device of a homogeneous orientation having a column height of 1.8 μm prepared in the first embodiment were measured.

Figure 10:
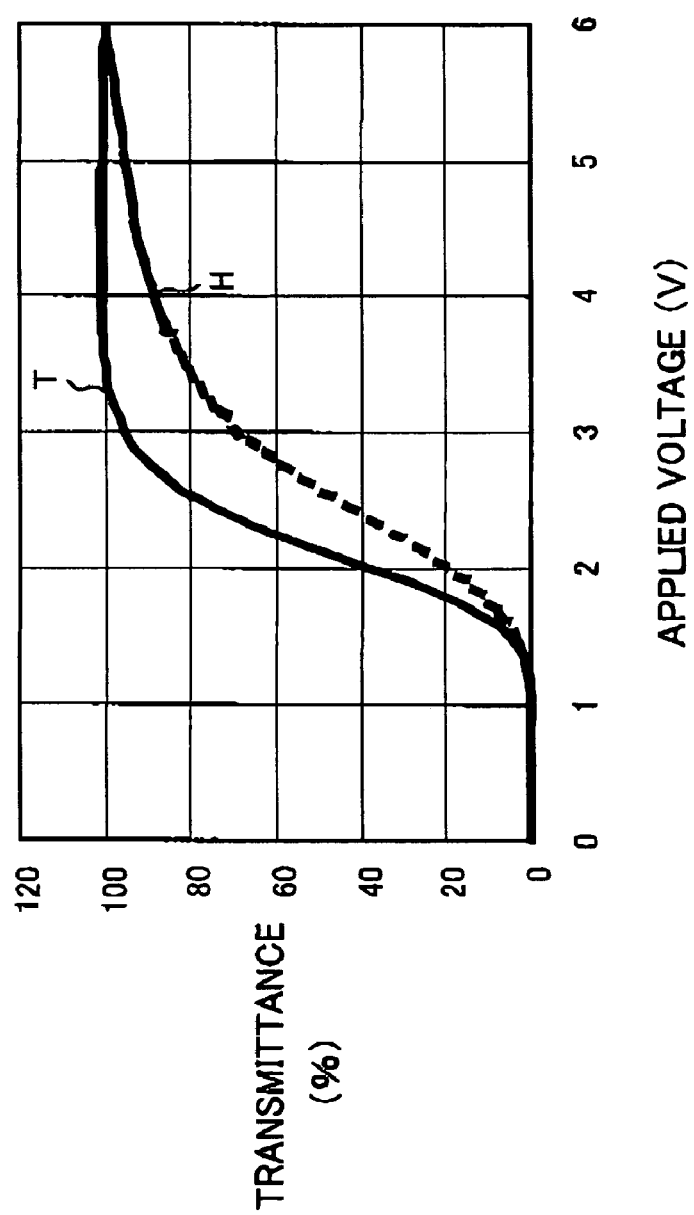
FIG. 10 is a view of voltage-transmittance characteristics of a twist oriented normally black mode semi-transmission liquid crystal display device and a homogeneously oriented normally black mode semi-transmission liquid crystal display device.

FIG. 10 is a view of results of the measurement of the voltage-transmittance characteristics of a semi-transmission liquid crystal display device of a twist orientation having a column height of 2.8 μm and a semi-transmission liquid crystal display device of a homogeneous orientation having a column height of 1.8 μm prepared in the first embodiment. In FIG. 10, the abscissa represents the applied voltage, and the ordinate represents the transmittance. Further, in FIG. 10, a curve indicated by T shows the characteristic of a twist orientation device, and H shows the characteristic of a homogeneous orientation device.

As shown in FIG. 10, by employing the twist orientation, the voltage at which the transmittance is saturated becomes smaller and a reduction of the voltage was achieved. It was seen from this that the twist orientation is effective also for the reduction of the power consumption.

Third Embodiment

Figure 11:
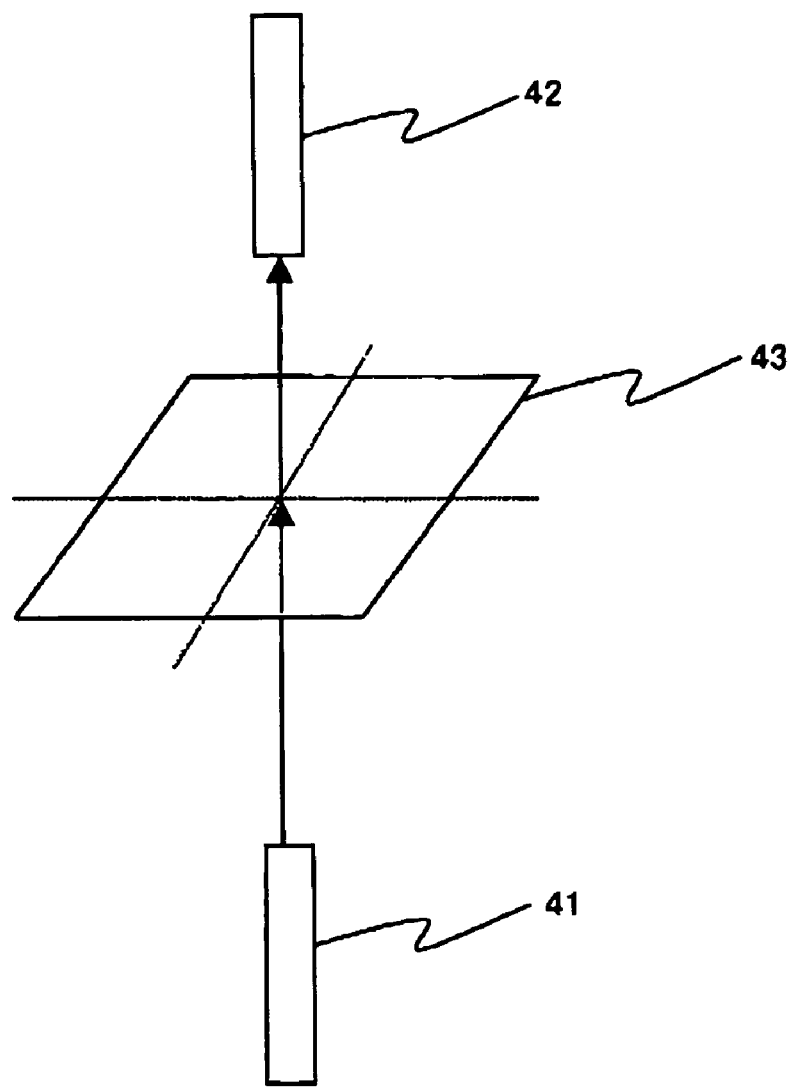
FIG. 11 is a view of a measurement device of transmission chromaticity.

A semi-transmission liquid crystal display device of a twist orientation having a column height of 2.8 μm and a semi-transmission liquid crystal display device of a homogeneous orientation having a column height of 1.8 μm prepared in the first embodiment were measured for the chromaticities of the R pixels, the chromaticities of the G pixels, and the transmission chromaticity coordinates of the B pixels when voltages of 5V were supplied to the R, G, and B pixels. A device 40 as shown in FIG. 11 was used for the measurement. In FIG. 11, 41 indicates a light source, 42 indicates a light receiving element, and 43 indicates a liquid crystal display panel. Note that a halogen lamp is used for the light source 41 and that the chromaticity is calculated by conversion to a D65 light source later.

Figure 12:
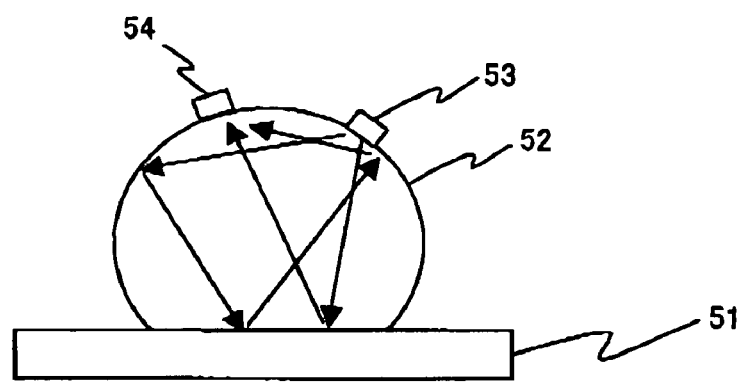
FIG. 12 is a view of a measurement device of reflection chromaticity.

Next, by using a device 50 as shown in FIG. 12, dispersion light was irradiated from a display surface side of the liquid crystal by an integrating sphere and the reflection characteristic was evaluated. In FIG. 12, 51 indicates a liquid crystal panel, 52 indicates an integrating sphere, 53 indicates a light source, and 54 indicates a light receiving element.

Figure 13A:
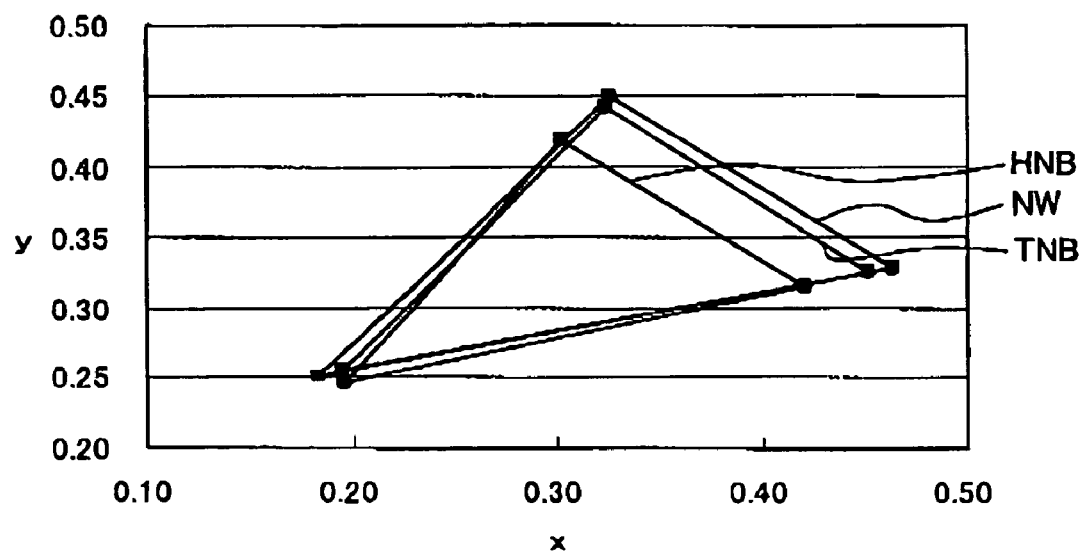
FIGS. 13A and 13B are views of reflection chromaticities and transmission chromaticities of a homogeneously oriented normally black mode semi-transmission liquid crystal display device, a twist oriented normally black mode semi-transmission liquid crystal display device, and a normally white mode semi-transmission liquid crystal display device used in the present embodiment.
Figure 13B:
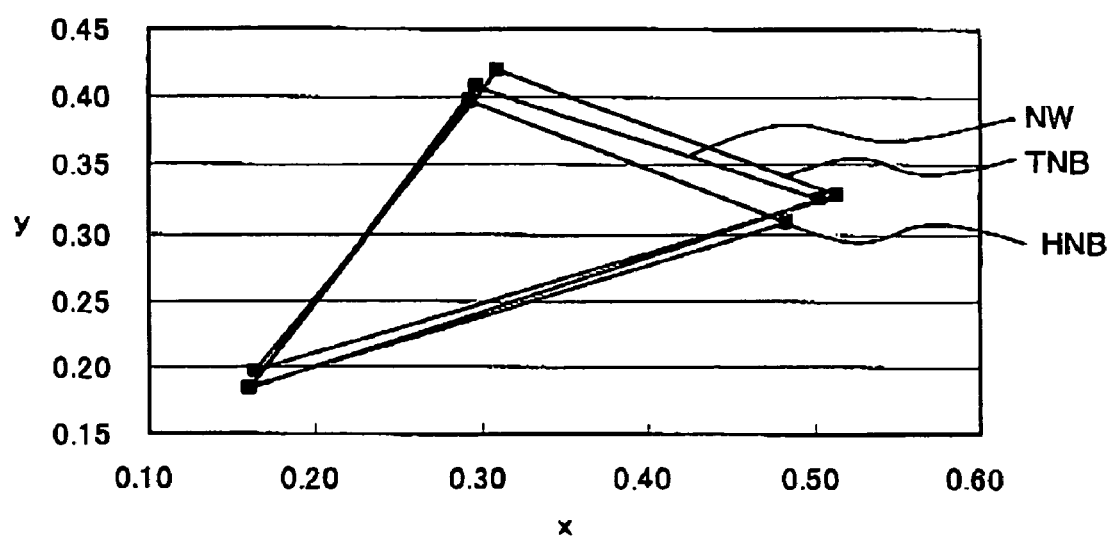

FIG. 13A is a view of the reflection chromaticities of a homogeneously oriented normally black mode semi-transmission liquid crystal display device, a twist oriented normally black mode semi-transmission liquid crystal display device, and a normally white mode semi-transmission liquid crystal display device used in the embodiment. FIG. 13B is a view of the transmission chromaticities of a homogeneously oriented normally black mode semi-transmission liquid crystal display device, a twist oriented normally black mode semi-transmission liquid crystal display device, and a normally white mode semi-transmission liquid crystal display device used in the embodiment. FIGS. 13A and 13B also show, for comparison, the reflection and transmission chromaticities of the normally white mode semi-transmission liquid crystal display device. In FIGS. 13A and 13B, the characteristics indicated by TNB show the measurement results of the twist oriented normally black mode, the characteristics indicated by HNB show the measurement results of the homogeneously oriented normally black mode, and the characteristics indicated by NW show the measurement results of the normally white mode.

As will be understood from this, a twist oriented semi-transmission liquid crystal display device is substantially the same in reflection and transmission chromaticities as the chromaticities of the normally white mode and is substantially equivalent also in the image quality.

Fourth Embodiment

The chromaticities of the dark state of the transmission were measured in a semi-transmission liquid crystal display device of a twist orientation having a column height of 2.8 μm and a semi-transmission liquid crystal display device of a homogeneous orientation having a column height of 1.8 μm prepared in the first embodiment by using the measurement device of FIG. 11. Note that an LED backlight was used for the light source.

Figure 15:
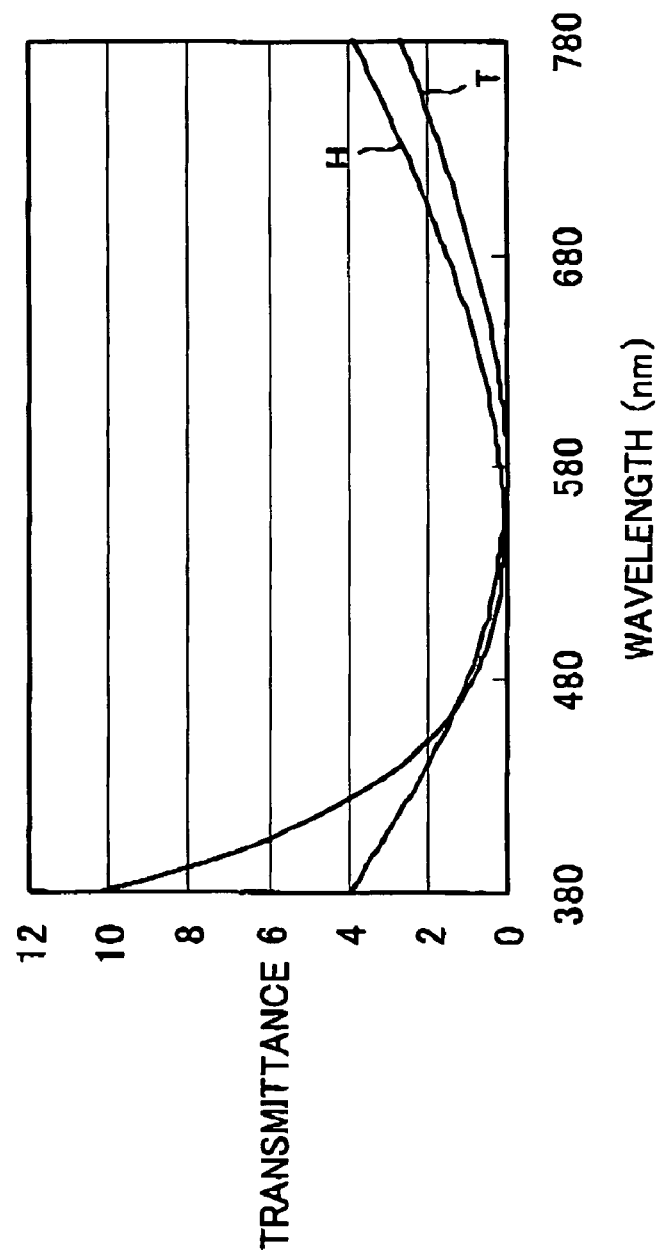
FIG. 15 is a view of a transmission spectrum of the dark state found from simulation.

FIG. 14 is a view of the measurement results of the chromaticities of the dark state of transmission. FIG. 15 is a view of the transmission spectrum of the dark state found by simulation. In FIG. 15, the abscissa indicates the wavelength, and the ordinate indicates the transmittance. Further, in FIG. 15, the characteristic indicated by T shows the characteristic of a twist oriented device, and the characteristic indicated by H shows the characteristic of a homogeneously oriented device.

As seen from the figures, in a device of the homogeneous orientation, the transmission dark state is colored blue. The device of the twist orientation is a more natural color. Further, when the transmission brightness is 50 cd/M$^2$ or more, there is no problem in the twist orientation, but in the homogeneous orientation, it was confirmed that the color black was felt as blue and therefore there was a problem. The above matter can also be confirmed by simulation. It will be understood that by employing the twist orientation, in the transmission spectrum of the dark state, the transmission on the short wavelength side and the long wavelength sides is suppressed, so the coloring of the black is suppressed (FIG. 15). Further, by the suppression of the light transmission of the short wavelength and the long wavelength in the black state, the contrast is improved. Compared with the contrast of 30 in the device of the homogeneous orientation, the contrast became 50 in the twist orientation.

Fifth Embodiment

Next, the optimum reflection gap with respect to the twist angle was found by simulation.

Figure 16:
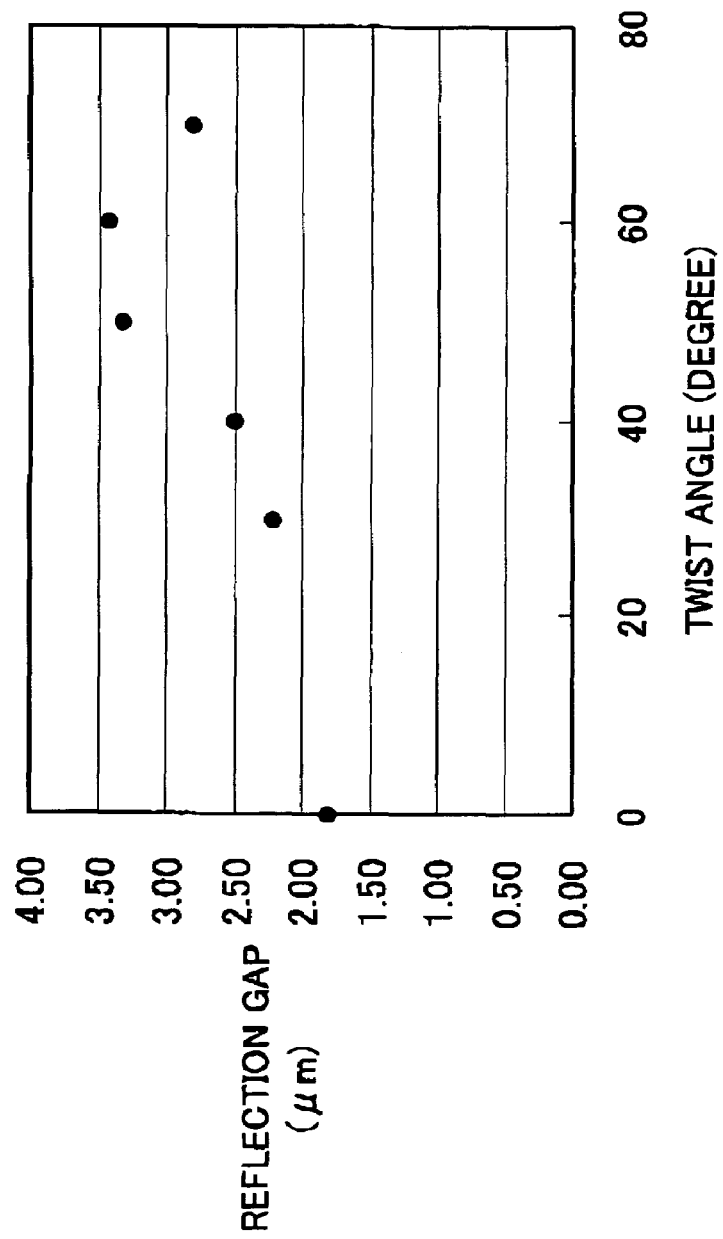
FIG. 16 is a view of an optimum reflection gap with respect to a twist angle.
Figure 17:
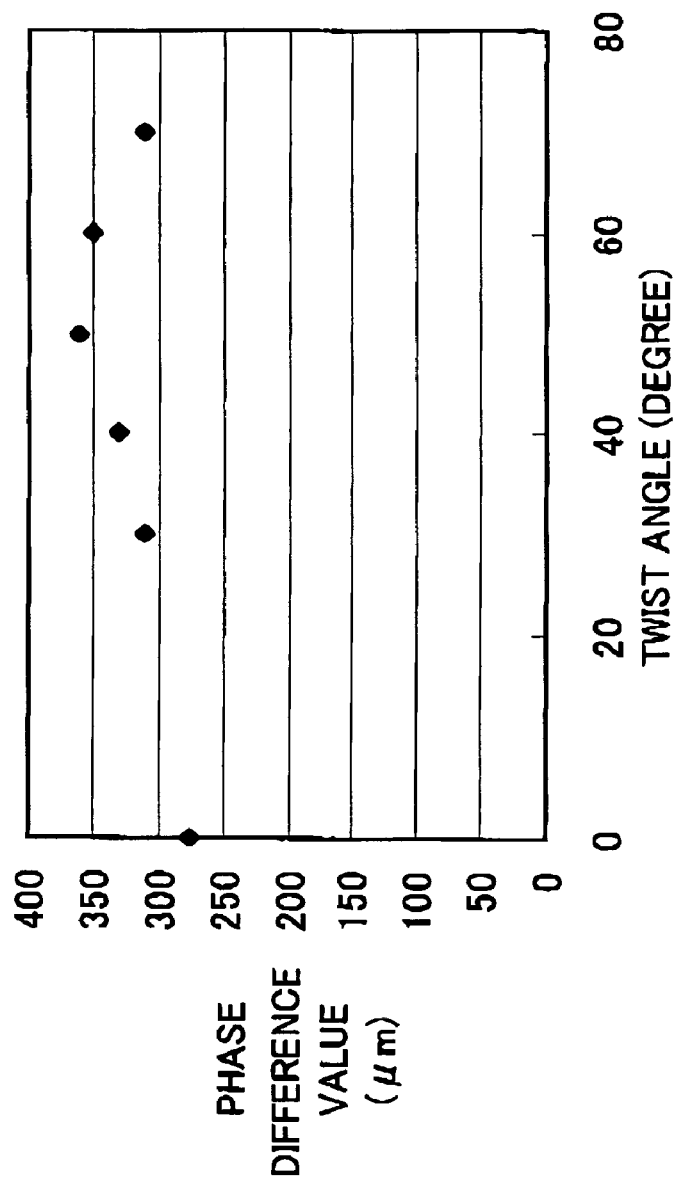
FIG. 17 is a view of an optimum phase difference value of a phase difference plate with respect to a twist angle.

FIG. 16 is a view of the optimum reflection gap with respect to the twist angle found by simulation. In FIG. 16, the abscissa represents the twist angle, and the ordinate represents the optimum reflection gap. Further, FIG. 17 is a view of the optimum phase difference value of the phase difference plate with respect to the twist angle. In FIG. 17, the abscissa represents the twist angle, and the ordinate represents the phase difference value of the phase difference plate.

As shown in FIG. 16, it will be understood that when the refractive index difference Δn of the liquid crystal material is 0.075, a reflection gap of 2 μm can be secured when the twist angle is 30 degrees or more. Further, at this time, it was seen that the optimum value of the phase difference plate used from the viewing surface side became as shown in FIG. 17, and 310 nm or more was required. Next, the optimum transmission gap with respect to each twist angle was found.

Figure 18:
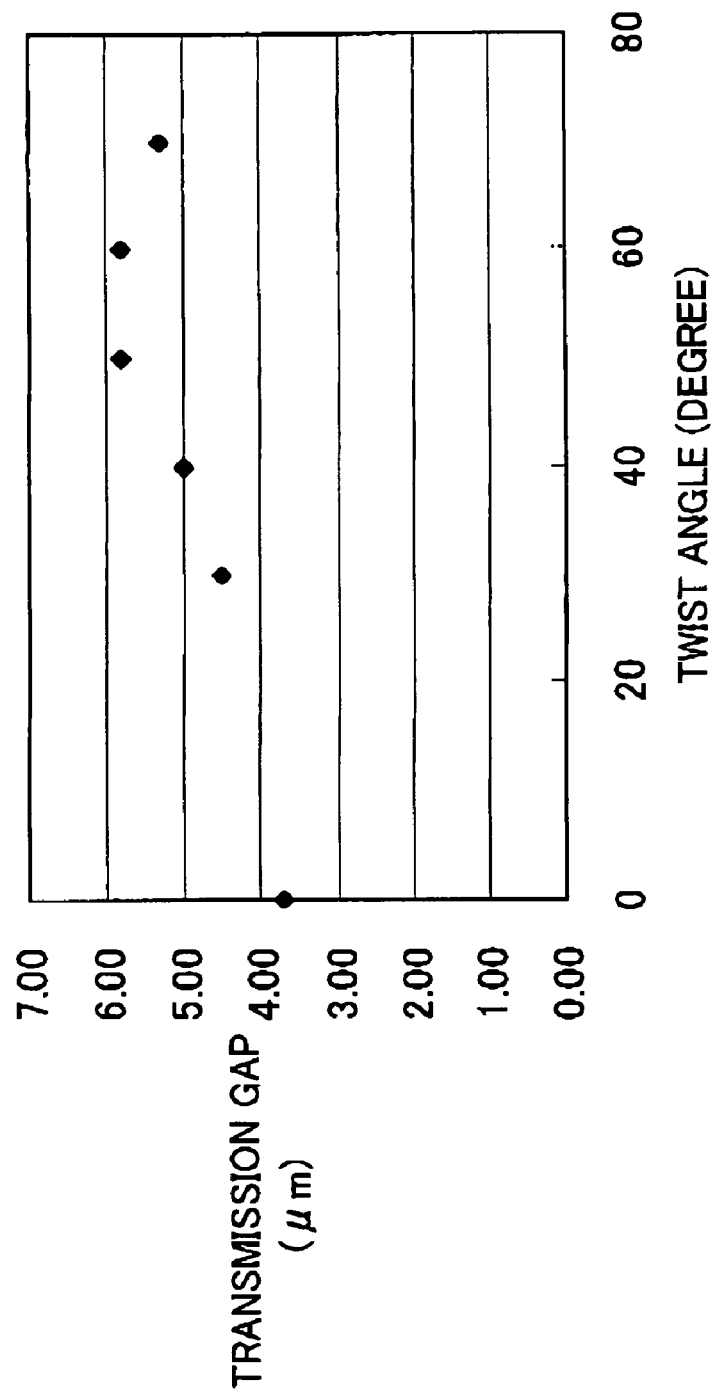
FIG. 18 is a view of an optimum transmission gap with respect to a twist angle.
Figure 19:
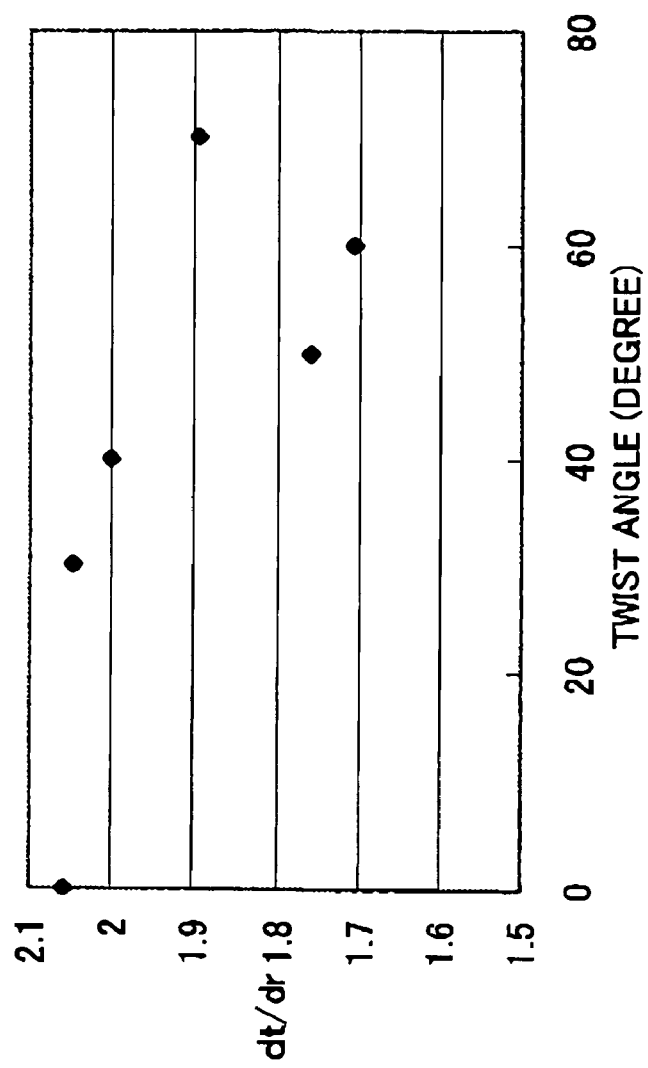
FIG. 19 is a view of a ratio of an optimum transmission gap and an optimum reflection gap with respect to a twist angle.

FIG. 18 is a view of the optimum transmission gap with respect to the twist angle. In FIG. 18, the abscissa represents the twist angle, and the ordinate represents the transmission gap. Further, FIG. 19 is a view of a ratio (dt/dr) of the optimum transmission gap and the optimum reflection gap with respect to the twist angle. In FIG. 19, the ratio dt/dr between the gap dt of the transmission portion 23 and the gap dr of the reflection portion 22 was found from FIG. 16 and FIG. 18. In FIG. 19, the abscissa represents the twist angle, and the ordinate represents the ratio (dt/dr) of the transmission gap and the optimum reflection gap.

It will be understood from FIG. 19 that the ratio dt/dr between the gap dt of the transmission portion 23 and the gap dr of the reflection portion 22 has to be within the following range:

$$1.7 \leq dt/dr \leq 2.05 \quad (1)$$

Further, based on the above results, twist oriented normally black semi-transmission liquid crystal display devices having twist angles of 10 degrees, 20 degrees, 30 degrees, 40 degrees, 50 degrees, 60 degrees, and 70 degrees were prepared using the optimum reflection gap, the optimum transmission gap, and the optimum phase difference plate value as references. The reflection contrasts at that time are shown in FIG. 20.

Figure 20:
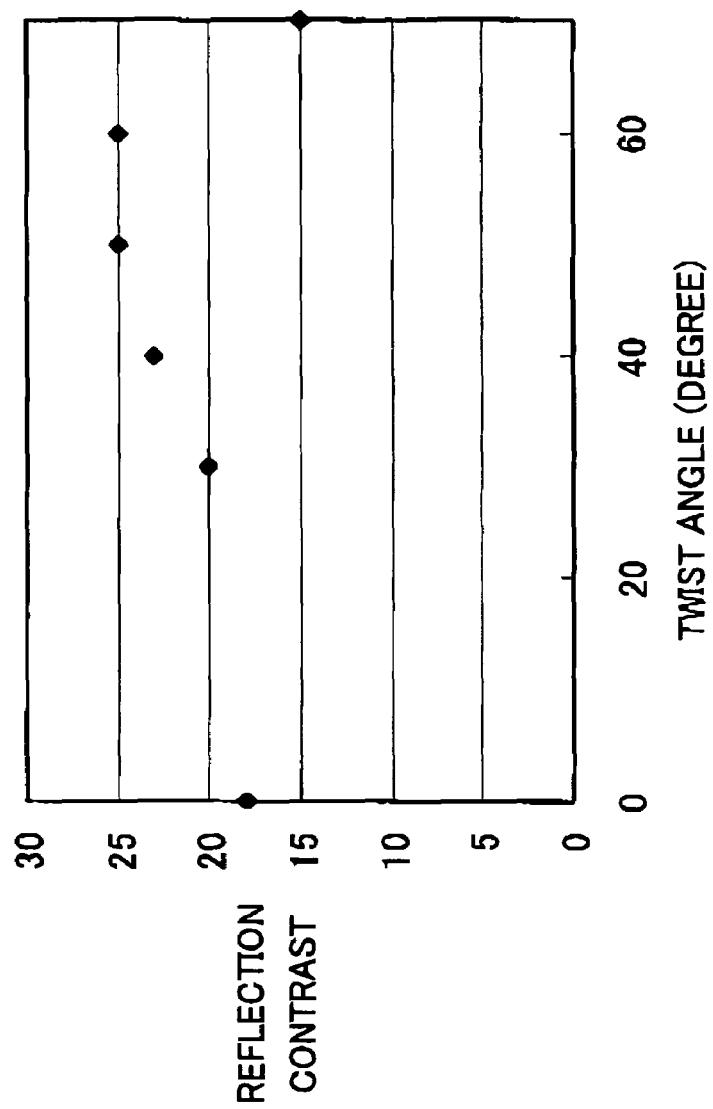
FIG. 20 is a view of a reflection contrast with respect to the twist angle.

FIG. 20 is a view of the reflection contrast with respect to the twist angle at that time. In FIG. 20, the abscissa indicates the twist angle, and the ordinate indicates the reflection contrast.

It will be understood from these results that a twist angle of 60 degrees or less is good for securing a good contrast.

Sixth Embodiment

Figure 21:
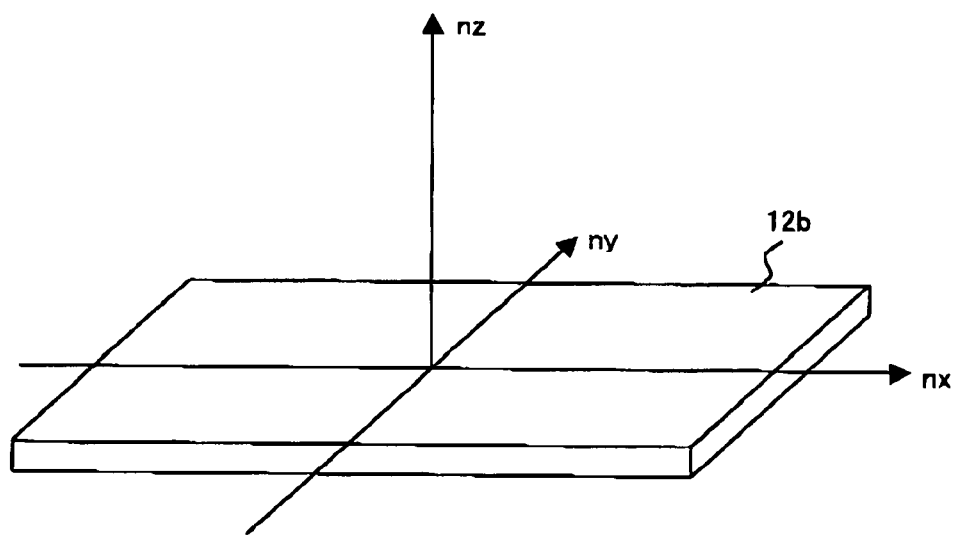
FIG. 21 is a view of a concept of nx, ny, and nz of a phase difference plate on the viewing surface side.

As shown in FIG. 21, the refractive index of the extension direction of the phase difference plate 12b is defined as nx, the refractive index of the extension direction and the vertical direction is defined as ny, the refractive index in the normal direction with respect to the phase difference plate surface is defined as nz, and the coefficient represented by the following equation is defined as the Nz coefficient:

$$Nz=(nx-nz)/(nx-ny) \quad (2)$$

Figure 22:
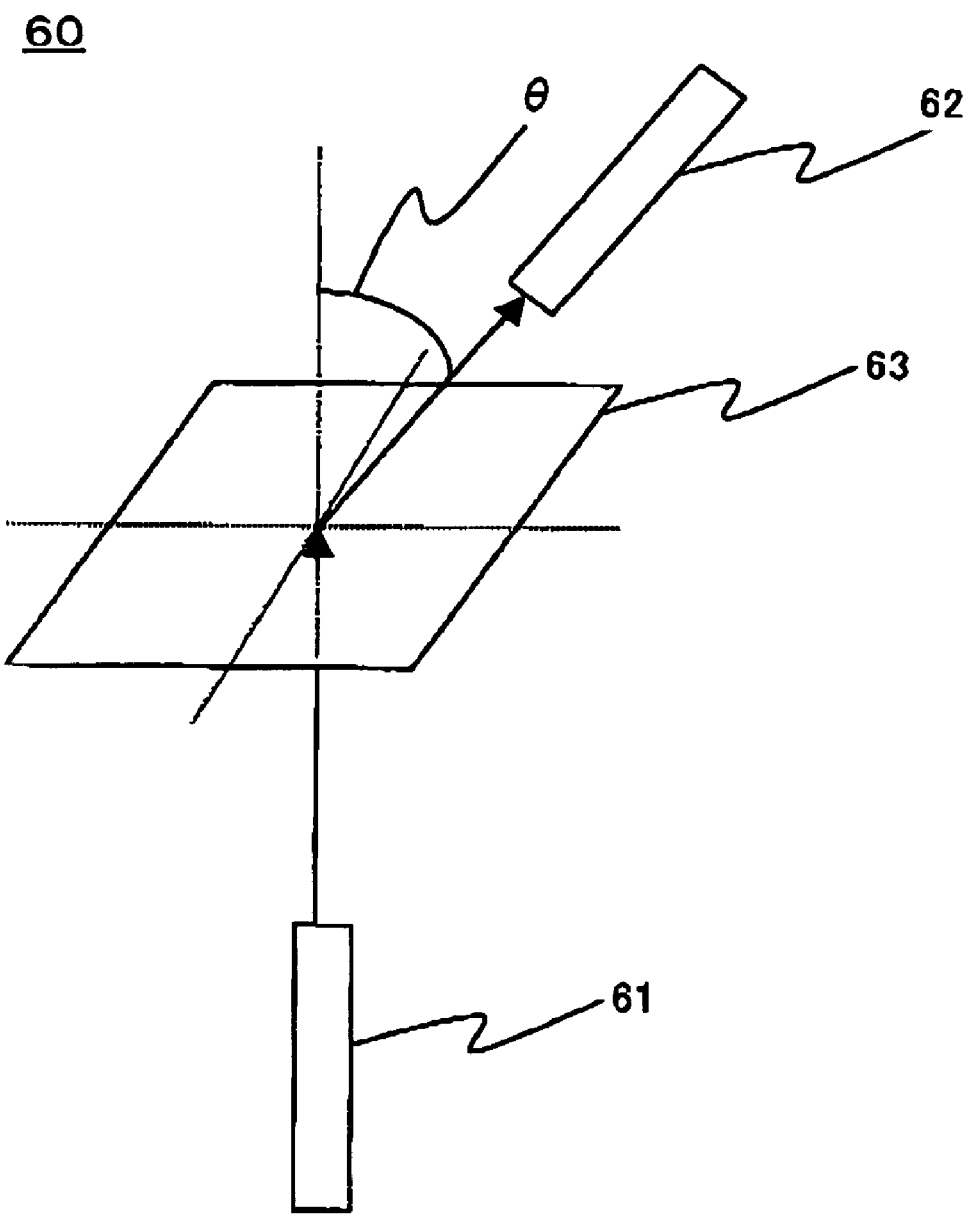
FIG. 22 is a view of a measurement device of a transmission viewing angle.

Three types of twist oriented semi-transmission liquid crystal display devices having a column height of 2.8 μm prepared in the first embodiment and set to Nz coefficients of the phase difference plate 12b on the viewing surface side of Nz=1, Nz=0.5, and Nz=0 were prepared and measured for viewing angle θ when the transmission contrast became 5 or more at azimuths of 0 degree, 90 degrees, 180 degrees, and 270 degrees. A conceptual view of a measurement system 60 used for the measurement is shown in FIG. 22. In FIG. 22, 61 indicates a light source, 62 indicates a light receiving element, and 63 indicates a liquid crystal display panel.

FIG. 23 is a view of the measurement values of the transmission viewing angle. It is seen from FIG. 23 that the device using the phase difference plate of Nz=0 has the broadest viewing angle. A response test was carried out, whereupon it was learned that the Nz coefficient was the viewing angle able to withstand real use in the following range:

$$0 \leq Nz \leq 0.5 \quad (3)$$

Seventh Embodiment

Figure 24:
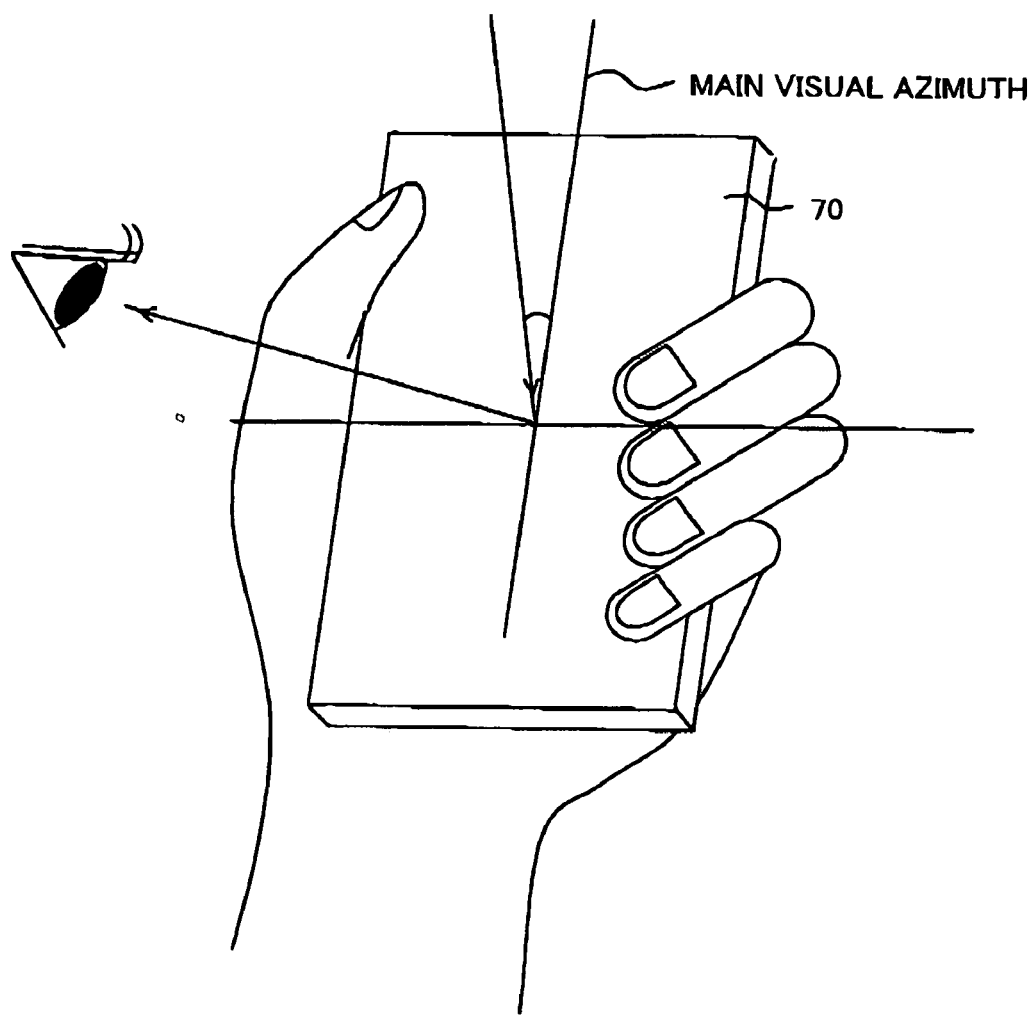
FIG. 24 is a view of a concept of a reflection main sight.

First, an explanation will be given from the definition of the main visual azimuth. In general, a PDA, a mobile phone, or another portable terminal 70 is used held in the hand as shown in FIG. 24. At this time, the azimuth of the upper side of the liquid crystal display device will be referred to as the "main visual azimuth". Much external light strikes the panel from this main visual azimuth, is reflected at the device, and reaches the eyes. Accordingly, when evaluating the contrast of the reflection, if the light is made to strike from the main visual azimuth by the device as in FIG. 7 for evaluation, a value near the contrast when actually used is obtained.

A semi-transmission liquid crystal display device of a twist orientation having a column height of 2.8 μm prepared in the first embodiment was set to a main visual azimuth of the 90 degrees azimuth of FIG. 5 to investigate the dependency of the reflection contrast on the azimuth angle. The incident light was made incident from a direction inclined by 30° from the substrate normal direction.

Figure 25:
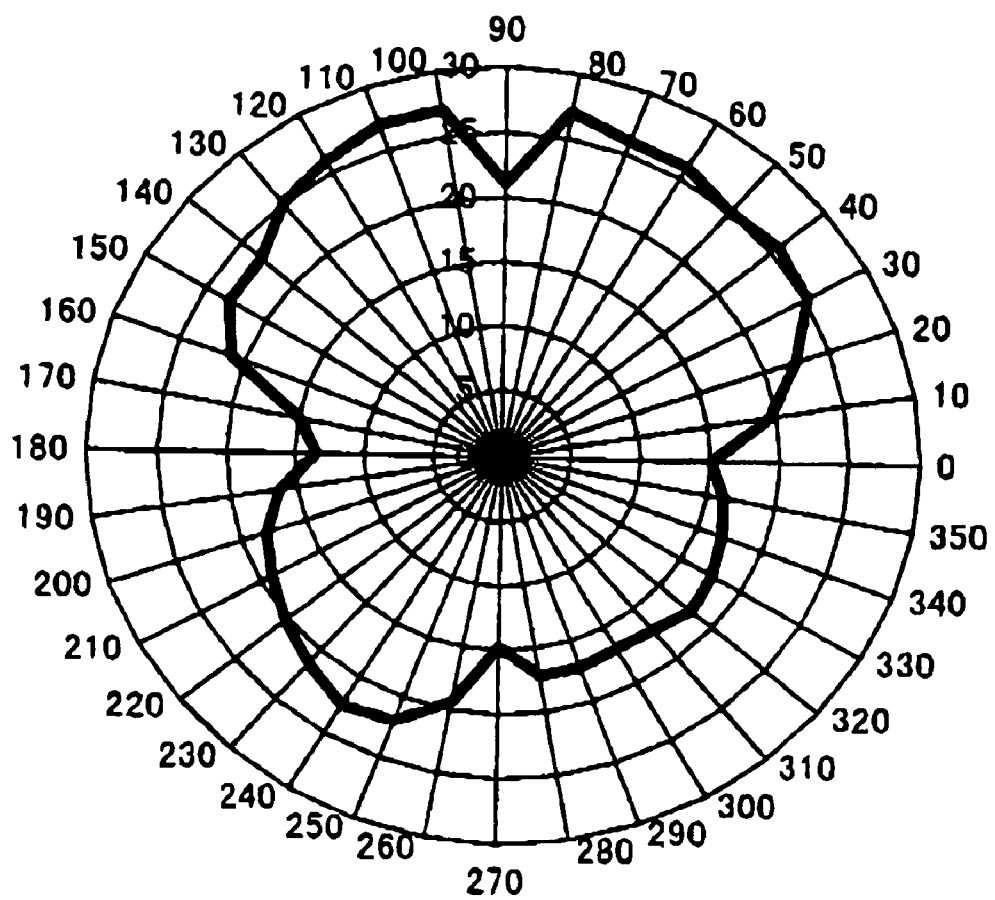
FIG. 25 is a view of a reflection contrast azimuth angle dependency in the case where the shape of the transmission portion is a rectanglar.
Figure 26:
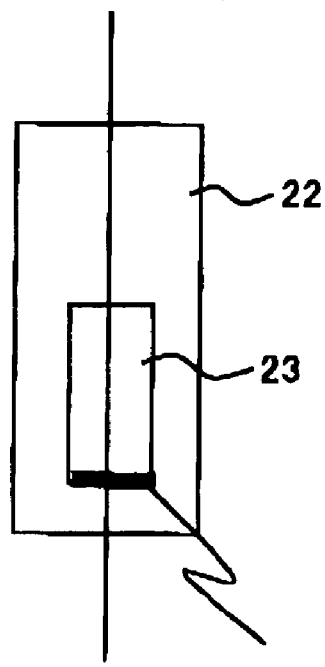
FIG. 26 is a view of a state where light is reflected at an edge of the transmission portion.

FIG. 25 is a view of the dependency of the reflection contrast on the azimuth angle when the shape of the transmission portion 23 is rectangular. In this way, the phenomenon of the contrast becoming smaller at the azimuths of 0 degree, 90 degrees, 180 degrees, and 270 degrees could be confirmed. On the other hand, the substrate A used in the first embodiment was used to prepare a normally white semi-transmission liquid crystal display device. The main visual azimuth was set in the same way as above to investigate the dependency of the reflection contrast on the azimuth angle, but such a phenomenon was not confirmed. Therefore, in the dark state of the semi-transmission liquid crystal display device of the twist orientation, the light was made incident at a 90 degree azimuth from a direction inclined by 30 degrees from the normal direction and observed by a microscope from the perpendicular direction. Then, the light was reflected and shone at the boundary between the transmission portion and the reflection portion on the opposite side to the main sight as shown in FIG. 26. Such a phenomenon did not occur in the normally white device. This is considered to occur due to the following:

Namely, in the dark state of the normally black mode, the dark state is formed by the liquid crystals 21 and the phase difference plate 12b on the viewing surface side. For this reason, if there is a disturbance in orientation of the liquid crystals 21, it leads to light leakage. Contrary to this, in the normally white mode, the dark state is formed by two phase difference plates on the viewing surface side. Birefringence is not so relevant at that time. Accordingly, even if there is a disturbance in orientation of the liquid crystals, it does not lead to much light leakage. It can be considered that a disturbance in orientation occurs at the portion of the boundary between the transmission portion and the reflection portion. In a device of the normally black mode, it is considered that this leads to light leakage, and the contrast is lowered.

Figure 27:
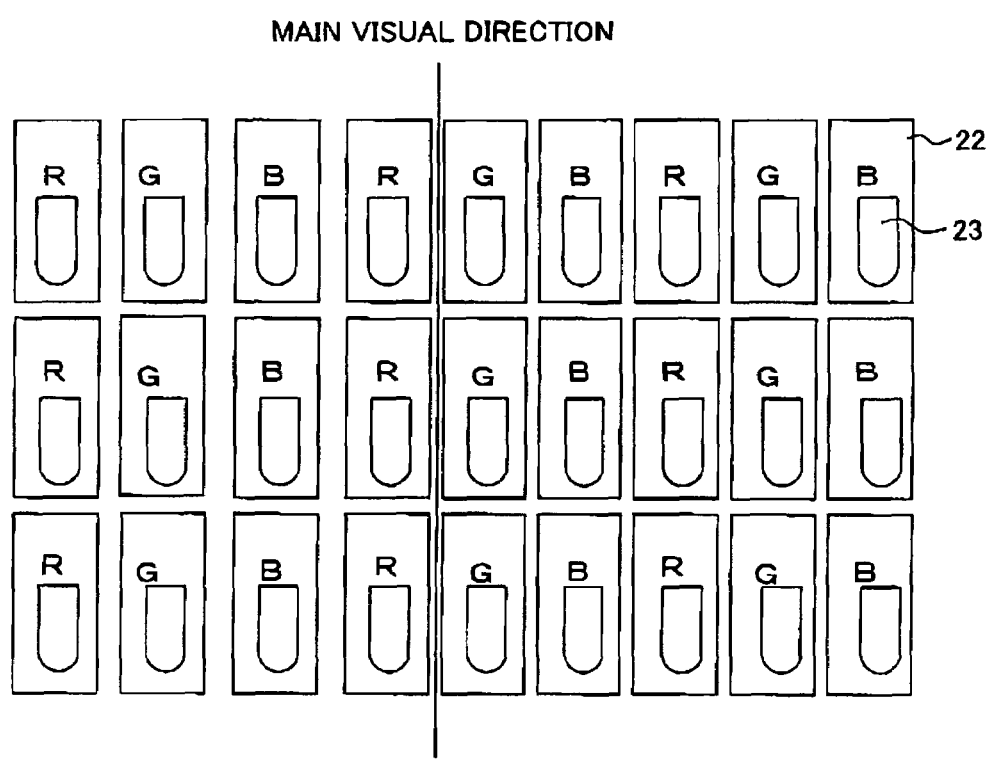
FIG. 27 is a view of a device wherein the shape of the transmission portion in the opposite direction to the main visual azimuth is made approximately circular.
Figure 28:
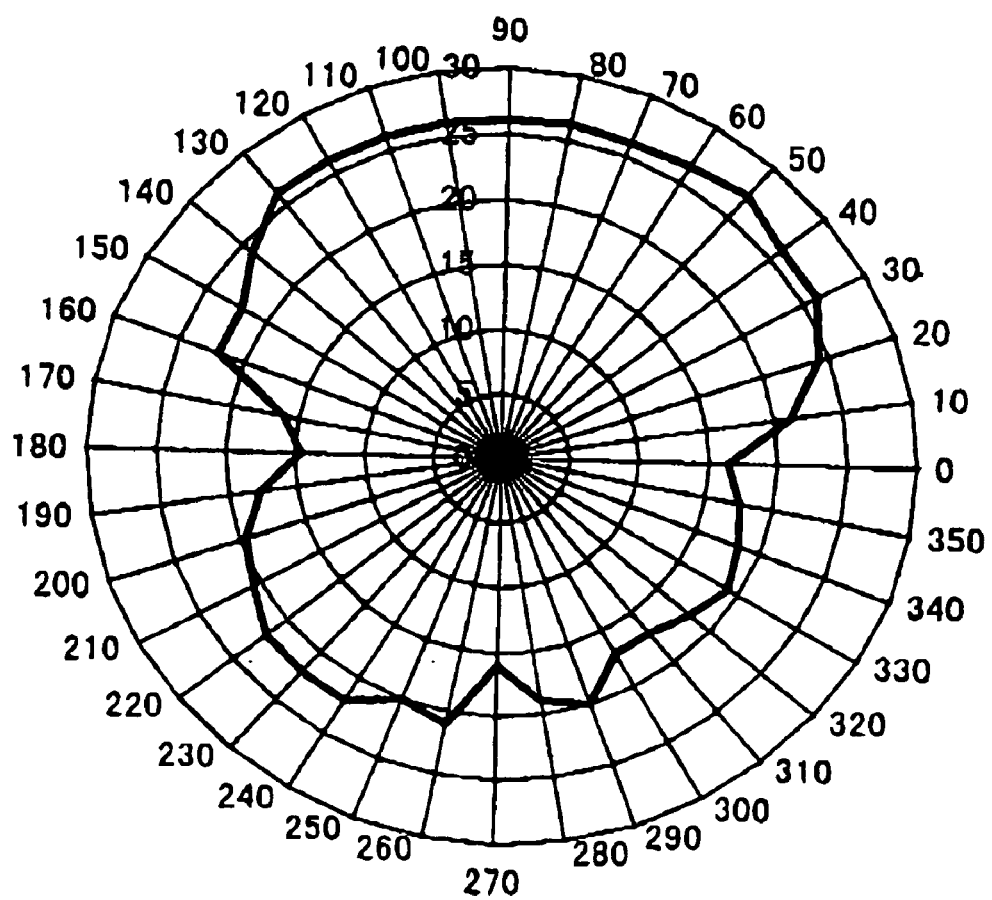
FIG. 28 is a view of a reflection contrast azimuth angle dependency of the device of FIG. 27.

Therefore, a device was prepared reduced in the absolute amount of the light leakage, as shown in FIG. 27, by making the boundary between the transmission portion 23 and the reflection portion 22 in the opposite direction to the main visual azimuth not a straight line, but an approximately circular shape having a predetermined radius of curvature R and investiated for the dependency of the reflection contrast on the azimuth angle, whereupon the reduction of the contrast of the main visual azimuth disappeared as shown in FIG. 28.

Summarizing the effects of the invention, as explained above, according to the present invention, large effects are exhibited compared with the case where the homogeneous orientation was used in the following points:

The R, G, and B chromaticities of the reflection and transmission are improved and the image quality is improved along with this. Further, a reduction of the voltage of for example about 1V to 2V can be achieved, whereby a reduction of the power consumption becomes possible. Further, when using a liquid crystal material having a refractive index difference Δn not problematic in reliability is used, a reflection gap of 2 μm or more not problematic in terms of production becomes possible, and an improvement in yield can be achieved. The degree of the black color of the dark state in transmission becomes natural and the image quality is improved in comparison with the homogeneous orientation. Further, by setting the twist angle to 30 degrees to 60 degrees, the phase difference value of the phase difference plate on the viewing surface side to 310 nm or more, and the ratio dt/dr between the reflection gap dr and the transmission gap dt to 1.7 to 2.05, there are the advantages that a reflection gap not problematic in terms of production becomes possible and the characteristics of the reflection and the transmission become optimum. Further, by setting the Nz coefficient of the phase difference plate used on the viewing surface side to $0 \leq N \leq 0.5$ or more, it becomes possible to achieve an increase in the viewing angle of transmission not problematic in practical use. Further, by employing a shape other than a straight line for at least one side in the shape of the boundary between the transmission portion and the reflection portion, for example, an approximately circular shape, the reflection contrast of the main visual direction is enhanced.

While the invention has been described with reference to specific embodiments chosen for purpose of illustration, it should be apparent that numerous modifications could be made thereto by those skilled in the art without departing from the basic concept and scope of the invention.

What is claimed is:

1. A liquid crystal display device employing a normally black mode, the liquid crystal display device comprising:
   a pixel having a reflection portion and a transmission portion;
   a first polarization plate on a viewing surface side on a viewing surface side of the liquid crystal display device;
   a phase difference plate on the viewing surface side of the liquid crystal display device; and
   a second polarization plate on a back surface of the liquid crystal display device,
   wherein an orientation mode of a liquid crystal of the liquid crystal display device is a twist orientation,
   wherein a ratio dt/dr between a gap dt of said transmission portion and a gap dr of said reflection portion satisfies a relationship of $1.7 \leq dt/dr \leq 2.05$, and
   wherein a phase difference value of said phase difference plate on the viewing surface side at a wavelength of 550 nm is 310 nm or more.

2. A liquid crystal display device employing a normally black mode, the liquid crystal display device comprising:
   a pixel having a reflection portion and a transmission portion;
   a first polarization plate on a viewing surface side on a viewing surface side of the liquid crystal display device;
   a phase difference plate on the viewing surface side of the liquid crystal display device; and
   a second polarization plate on a back surface of the liquid crystal display device,
   wherein an orientation mode of a liquid crystal of the liquid crystal display device is a twist orientation,
   wherein the twist angle is 30 degrees to 60 degrees, and
   wherein a phase difference value of said phase difference plate on the viewing surface side at a wavelength of 550 nm is 310 nm or more.

3. A liquid crystal display device employing a normally black mode, the liquid crystal display device comprising:
   a pixel having a reflection portion and a transmission portion;
   a first polarization plate on a viewing surface side on a viewing surface side of the liquid crystal display device;
   a phase difference plate on the viewing surface side of the liquid crystal display device;
   a second polarization plate on a back surface of the liquid crystal display device,
   wherein an orientation mode of a liquid crystal of the liquid crystal display device is a twist orientation,
   wherein a ratio dt/dr between a gap dt of said transmission portion and a gap dr of said reflection portion satisfies a relationship of $1.7 \leq dt/dr \leq 2.05$,
   wherein the twist angle is 30 degrees to 60 degrees, and
   wherein a phase difference value of said phase difference plate on the viewing surface side at a wavelength of 550 nm is 310 nm or more.

4. A liquid crystal display device employing a normally black mode, the liquid crystal display device comprising:
   a pixel having a reflection portion and a transmission portion;
   a first polarization plate on a viewing surface side on a viewing surface side of the liquid crystal display device;
   a phase difference plate on the viewing surface side of the liquid crystal display device;
   a second polarization plate on a back surface of the liquid crystal display device,
   wherein an orientation mode of a liquid crystal of the liquid crystal display device is a twist orientation,
   wherein a ratio dt/dr between a gap dt of said transmission portion and a gap dr of said reflection portion satisfies a relationship of $1.7 \leq dt/dr \leq 2.05$, and
   wherein the a phase difference value of said phase difference plate on the viewing surface side at a wavelength of 550 nm is 310 nm or more.

* * * * *